(12) United States Patent
Kooiman et al.

(10) Patent No.: US 10,220,936 B2
(45) Date of Patent: Mar. 5, 2019

(54) WING PIVOT STRUCTURES FOR TILTROTOR AIRCRAFT

(71) Applicant: Bell Helicopter Textron Inc., Fort Worth, TX (US)

(72) Inventors: James Everett Kooiman, Fort Worth, TX (US); John Richard McCullough, Fort Worth, TX (US); Brian Dale Obert, Fort Worth, TX (US)

(73) Assignee: Bell Helicopter Textron Inc., Fort Worth, TX (US)

( * ) Notice: Subject to any disclaimer, the term of this patent is extended or adjusted under 35 U.S.C. 154(b) by 295 days.

(21) Appl. No.: 15/271,717

(22) Filed: Sep. 21, 2016

(65) Prior Publication Data

US 2018/0079486 A1 Mar. 22, 2018

(51) Int. Cl.
| | |
|---|---|
| B64C 3/56 | (2006.01) |
| B64C 29/00 | (2006.01) |
| B64C 11/28 | (2006.01) |
| B64C 5/10 | (2006.01) |
| B64C 5/02 | (2006.01) |

(52) U.S. Cl.
CPC .................. *B64C 3/56* (2013.01); *B64C 5/02* (2013.01); *B64C 5/10* (2013.01); *B64C 11/28* (2013.01); *B64C 29/0033* (2013.01)

(58) Field of Classification Search
CPC ......... B64C 29/033; B64C 3/56; B64C 11/28; B64C 5/10; B64C 5/02
See application file for complete search history.

(56) References Cited

U.S. PATENT DOCUMENTS

| | | | | |
|---|---|---|---|---|
| 3,490,720 A | * | 1/1970 | Girard ....................... | B64C 3/40 244/7 R |
| 4,132,374 A | * | 1/1979 | Abell ........................ | B64C 3/40 244/46 |
| 4,691,878 A | * | 9/1987 | Vaughan ................... | B64C 3/56 244/49 |
| 5,337,974 A | * | 8/1994 | Rumberger ............... | B64C 3/40 244/39 |
| 5,836,541 A | * | 11/1998 | Pham ........................ | B60F 5/02 244/2 |
| 5,984,228 A | * | 11/1999 | Pham ....................... | B64C 37/00 244/100 R |
| 6,129,306 A | * | 10/2000 | Pham ........................ | B60F 5/02 244/2 |

(Continued)

*Primary Examiner* — Timothy D Collins
*Assistant Examiner* — Tye William Abell
(74) *Attorney, Agent, or Firm* — Lawrence Youst PLLC

(57) ABSTRACT

A wing pivot apparatus for rotating a wing between a flight orientation and a stowed orientation relative to a fuselage of a tiltrotor aircraft. The apparatus includes a guide ring that is fixably coupled to the fuselage. Forward and aft wing attach assemblies are coupled respectively to forward and aft spars of the wing and are moveably supported by the guide ring. Forward and aft wing support fittings are coupled respectively to the forward and aft spars of the wing and are selectively securable respectively to first and second fore-aft beams of the fuselage. A plurality of lock assemblies selectively secures the wing support fittings to the fore-aft beams of the fuselage when the wing is in the flight orientation. An actuator coupled to the fuselage is operable to reversibly rotate the wing between the flight orientation and the stowed orientation.

18 Claims, 12 Drawing Sheets

(56) References Cited

U.S. PATENT DOCUMENTS 8,292,216 B1\* 10/2012 Rumberger, Jr. ......... B64C 3/56
244/39
8,371,520 B2\* 2/2013 Easter ...................... B60F 5/02
244/2

\* cited by examiner

WING PIVOT STRUCTURES FOR TILTROTOR AIRCRAFT

TECHNICAL FIELD OF THE DISCLOSURE

The present disclosure relates, in general, to tiltrotor aircraft having a VTOL flight mode, a forward flight mode and a storage mode and, in particular, to wing pivot structures for stowing the wing of a tiltrotor aircraft to reduced the footprint of the tiltrotor aircraft in the storage mode.

BACKGROUND

Fixed-wing aircraft, such as airplanes, are capable of flight using wings that generate lift responsive to the forward airspeed of the aircraft, which is generated by thrust from one or more jet engines or propellers. The wings generally have an airfoil cross section that deflects air downward as the aircraft moves forward, generating the lift force to support the aircraft in flight. Fixed-wing aircraft, however, typically require a runway that is hundreds or thousands of feet long for takeoff and landing.

Unlike fixed-wing aircraft, vertical takeoff and landing (VTOL) aircraft do not require runways. Instead, VTOL aircraft are capable of taking off, hovering and landing vertically. One example of a VTOL aircraft is a helicopter which is a rotorcraft having one or more rotors that provide lift and thrust to the aircraft. The rotors not only enable hovering and vertical takeoff and landing, but also enable forward, backward and lateral flight. These attributes make helicopters highly versatile for use in congested, isolated or remote areas. Helicopters, however, typically lack the forward airspeed of fixed-wing aircraft due to the phenomena of retreating blade stall and advancing blade compression.

Tiltrotor aircraft attempt to overcome this drawback by including a set of proprotors that can change their plane of rotation based on the operation being performed. Tiltrotor aircraft generate lift and propulsion using proprotors that are typically coupled to nacelles mounted near the ends of a fixed wing. The nacelles rotate relative to the fixed wing such that the proprotors have a generally horizontal plane of rotation in a VTOL flight mode and a generally vertical plane of rotation in a forward flight mode, wherein the fixed wing provides lift and the proprotors provide forward thrust. In this manner, tiltrotor aircraft combine the vertical lift capability of a helicopter with the speed and range of fixed-wing aircraft. It has been found, however, that tiltrotor aircraft may occupy a large footprint when not in use, such as during storage on an aircraft carrier flight deck. Accordingly, a need has arisen for improved storage modes for tiltrotor aircraft.

SUMMARY

In a first aspect, the present disclosure is directed to a wing pivot apparatus for rotating a wing between a flight orientation and a stowed orientation relative to a fuselage of a tiltrotor aircraft. The apparatus includes a guide ring fixably coupled to the fuselage. Forward wing attach assemblies are coupled to a forward spar of the wing and are moveably supported by the guide ring. Aft wing attach assemblies are coupled to an aft spar of the wing and are moveably supported by the guide ring. First and second forward wing support fittings are coupled to the forward spar of the wing and are selectively secured respectively to first and second fore-aft beams of the fuselage. First and second aft wing support fittings are coupled to the aft spar of the wing and are selectively secured respectively to the first and second fore-aft beams of the fuselage. A plurality of lock assemblies selectively secures the wing support fittings to the fore-aft beams of the fuselage when the wing is in the flight orientation. An actuator coupled to the fuselage is operable to reversibly rotate the wing between the flight orientation and the stowed orientation.

In some embodiments, the guide ring may include a rail and the wing attach assemblies may include one or more roller bearings operable to engage the rail. In certain embodiments, the guide ring may be securably coupled to the first and second fore-aft beams of the fuselage. In some embodiments, the lock assemblies may selectively secure the wing support fittings directly to the fore-aft beams of the fuselage. In such embodiments, at least two lock assemblies may selectively secure each wing support fitting directly to the respective fore-aft beam of the fuselage. In other embodiments, a plurality of clevises may be securably coupled to the fore-aft beams of the fuselage and the wing support fittings may each include at least two lugs that are operable to sweep through the devises such that the lock assemblies are operable to selectively secure the wing support fittings to the fore-aft beams of the fuselage when the wing is in the flight orientation and such that the actuator is operable to reversibly rotate the wing between the flight orientation and the stowed orientation when the lock assemblies are disengaged. In certain embodiments, the lock assemblies may be actuated pins. In some embodiments, the actuator may be a rotary actuator such as a capstan actuator or a gear driven actuator. In other embodiments, the actuator may be a linear actuator.

In a second aspect, the present disclosure is directed to a tiltrotor aircraft having a VTOL flight mode, a forward flight mode and a storage mode. The aircraft includes a fuselage and a wing rotatably mounted to the fuselage. The wing is reversibly rotatable between a flight orientation, generally perpendicular to the fuselage, in the flight modes, and a stowed orientation, generally parallel to the fuselage, in the storage mode. A wing pivot apparatus is disposed between the fuselage and the wing. The wing pivot apparatus includes a guide ring fixably coupled to the fuselage. Forward wing attach assemblies are coupled to a forward spar of the wing and are moveably supported by the guide ring. Aft wing attach assemblies are coupled to an aft spar of the wing and are moveably supported by the guide ring. First and second forward wing support fittings are coupled to the forward spar of the wing and are selectively secured respectively to the first and second fore-aft beams of the fuselage. First and second aft wing support fittings are coupled to the aft spar of the wing and are selectively secured respectively to the first and second fore-aft beams of the fuselage. A plurality of lock assemblies selectively secures the wing support fittings to the fore-aft beams of the fuselage when the wing is in the flight orientation. An actuator coupled to the fuselage is operable to reversibly rotate the wing between the flight orientation and the stowed orientation.

BRIEF DESCRIPTION OF THE DRAWINGS

For a more complete understanding of the features and advantages of the present disclosure, reference is now made to the detailed description along with the accompanying figures in which corresponding numerals in the different figures refer to corresponding parts and in which.

DETAILED DESCRIPTION

While the making and using of various embodiments of the present disclosure are discussed in detail below, it should be appreciated that the present disclosure provides many applicable inventive concepts, which can be embodied in a wide variety of specific contexts. The specific embodiments discussed herein are merely illustrative and do not delimit the scope of the present disclosure. In the interest of clarity, not all features of an actual implementation may be described in this specification. It will of course be appreciated that in the development of any such actual embodiment, numerous implementation-specific decisions must be made to achieve the developer's specific goals, such as compliance with system-related and business-related constraints, which will vary from one implementation to another. Moreover, it will be appreciated that such a development effort might be complex and time-consuming but would be a routine undertaking for those of ordinary skill in the art having the benefit of this disclosure.

In the specification, reference may be made to the spatial relationships between various components and to the spatial orientation of various aspects of components as the devices are depicted in the attached drawings. However, as will be recognized by those skilled in the art after a complete reading of the present disclosure, the devices, members, apparatuses, and the like described herein may be positioned in any desired orientation. Thus, the use of terms such as "above," "below," "upper," "lower" or other like terms to describe a spatial relationship between various components or to describe the spatial orientation of aspects of such components should be understood to describe a relative relationship between the components or a spatial orientation of aspects of such components, respectively, as the device described herein may be oriented in any desired direction.

Figure 1A:
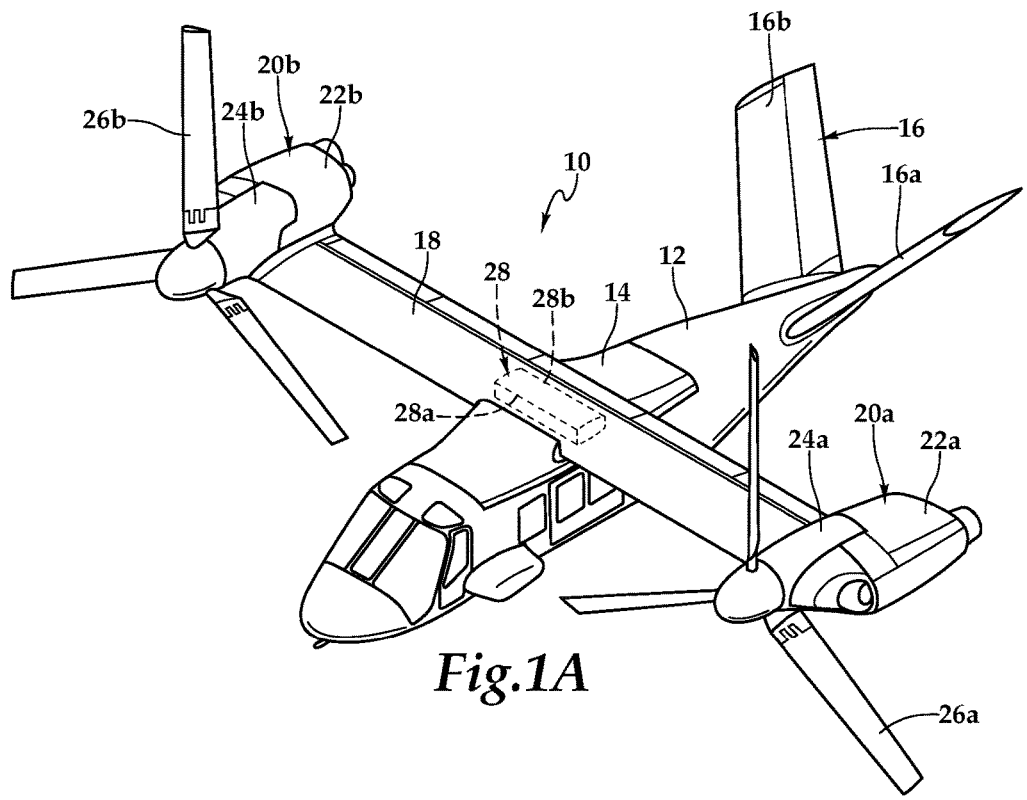
FIGS. 1A-1D are schematic illustrations of an exemplary tiltrotor aircraft in forward flight mode, in VTOL flight mode, in transition from VTOL flight mode to storage mode and in storage mode in accordance with embodiments of the present disclosure.
Figure 1B:
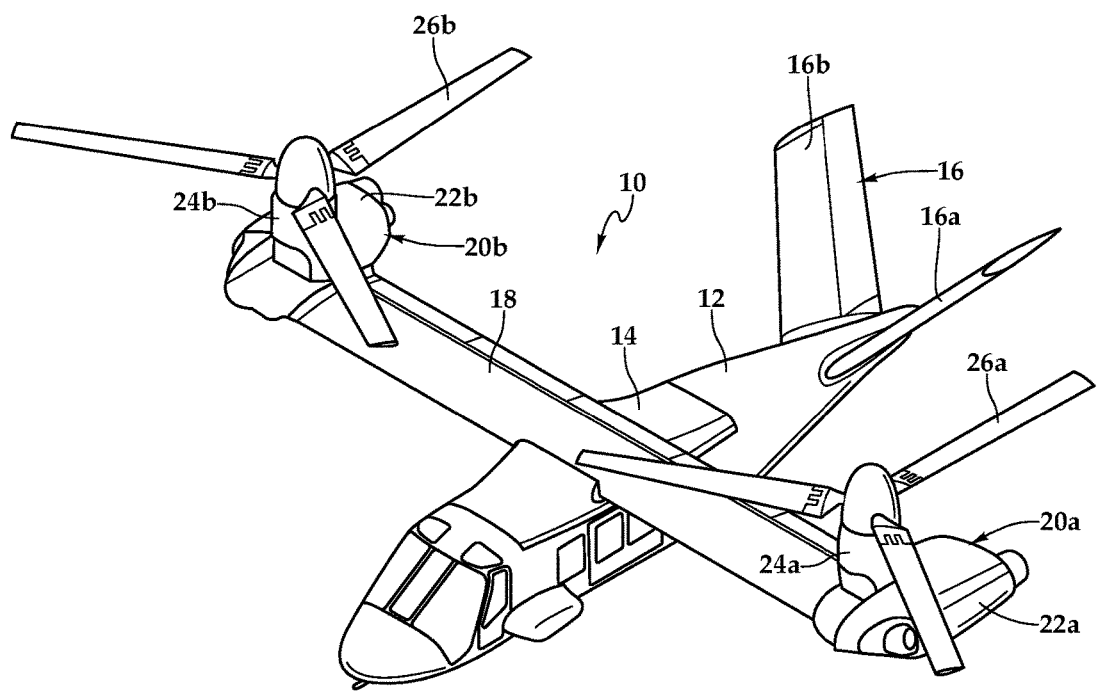

Referring to FIGS. 1A-1D in the drawings, a tiltrotor aircraft is schematically illustrated and generally designated 10. Aircraft 10 includes a fuselage 12, a wing mount assembly 14 that is rotatable relative to fuselage 12 and a tail assembly 16 including rotatably mounted tail members 16a, 16b having control surfaces operable for horizontal and/or vertical stabilization during forward flight. A wing 18 is supported by wing mount assembly 14 and rotates with wing mount assembly 14 relative to fuselage 12 as discussed herein. Located at outboard ends of wing 18 are propulsion assemblies 20a, 20b. Propulsion assembly 20a includes a nacelle depicted as fixed pylon 22a that houses an engine and transmission. In addition, propulsion assembly 20a includes a mast assembly 24a that is rotatable relative to fixed pylon 22a between a generally horizontal orientation, as best seen in FIG. 1A, a generally vertical orientation, as best seen in FIG. 1B. Propulsion assembly 20a also includes a proprotor assembly 26a that is rotatable relative to mast assembly 24a responsive to torque and rotational energy provided via a rotor hub assembly and drive system mechanically coupled to the engine and transmission.

Likewise, propulsion assembly 20b includes a nacelle depicted as fixed pylon 22b that houses an engine and transmission, a mast assembly 24b that is rotatable relative to fixed pylon 22b and a proprotor assembly 26b that is rotatable relative to mast assembly 24b responsive to torque and rotational energy provided via a rotor hub assembly and drive system mechanically coupled to the engine and transmission. Wing 18 includes a spar assembly 28 that extends the span of wing 18 and serves as the primary structural member of wing 18. The portion of spar assembly 28 above fuselage 12 is depicted in phantom in FIG. 1A. As discussed herein, spar assembly 28 includes a forward spar 28a and an aft spar 28b that are coupled to a wing pivot apparatus for rotating wing 18 between a flight orientation, as best seen in FIGS. 1A-1B and a stowed orientation, as best seen in FIG. 1D.

FIG. 1A illustrates aircraft 10 in airplane or forward flight mode, in which proprotor assemblies 26a, 26b are rotating in a substantially vertical plane to provide a forward thrust enabling wing 18 to provide a lifting force responsive to forward airspeed, such that aircraft 10 flies much like a conventional propeller driven aircraft. FIG. 1B illustrates aircraft 10 in helicopter or VTOL flight mode, in which proprotor assemblies 26a, 26b are rotating in a substantially horizontal plane to provide a lifting thrust, such that aircraft 10 flies much like a conventional helicopter. It should be appreciated that aircraft 10 can be operated such that proprotor assemblies 26a, 26b are selectively positioned between forward flight mode and VTOL flight mode, which can be referred to as a conversion flight mode. Even though aircraft 10 has been described as having one engine in each fixed pylon 22a, 22b, it should be understood by those having ordinary skill in the art that other engine arrangements are possible and are considered to be within the scope of the present disclosure including, for example, having a single engine which may be housed within the fuselage that provides torque and rotational energy to both proprotor assemblies 26a, 26b.

Figure 1C:
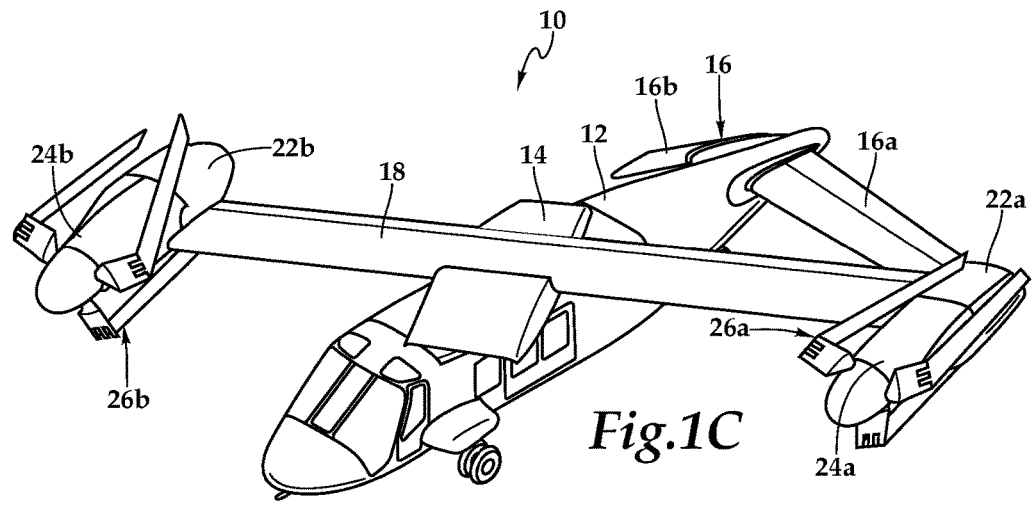
Figure 1D:
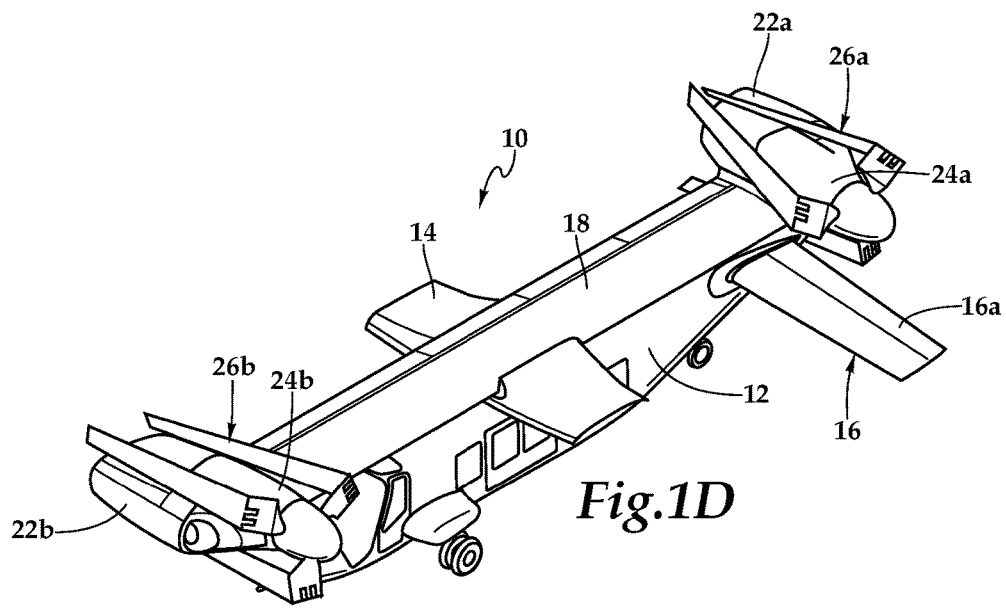

FIG. 1C illustrates tiltrotor aircraft 10 during a transition between VTOL flight mode and storage mode. To achieve this transition, it is noted that wing 18 is reversibly rotatable between the flight orientation that is generally perpendicular to fuselage 12, as best seen in FIG. 1B, and the stowed orientation that is generally parallel to fuselage 12, as best seen in FIG. 1D. In addition, mast assemblies 24a, 24b are reversibly rotatable between a generally vertical orientation, as best seen in FIG. 1B, and a generally horizontal orientation, as best seen in FIG. 1D. Proprotor assemblies 26a, 26b each have a radially extended orientation, as best seen in FIG. 1B, and a stowed orientation, as best seen in FIG. 1D. During the transition process, it is important to avoid contact between the various components of aircraft 10 with each other as well as to avoid contact between the various components of aircraft 10 and the surface on which aircraft 10 rests. To achieve this result, certain of the steps required for the transition, or portions thereof, may need to be performed before or while other steps, or portions thereof, are being performed. These sequential and/or simultaneous operations are enabled by having individually controlled actuators operating to transition the various components of aircraft 10 independent of one another. For example, rotation of wing 18 relative to fuselage 12 is independent of rotation of mast assembly 24a relative to pylon assembly 22a. Likewise, rotation of mast assembly 24a relative to pylon assembly 22a is independent of rotation mast assembly 24b relative to pylon assembly 22b. Similarly, rotation of mast assembly 24a relative to pylon assembly 22a is independent of the folding of the rotor blades relative to the rotor hubs. As such, those having ordinary skill in the art will understand that all such operations may be controlled individually and independent of one another.

As illustrated in FIG. 1C, wing 18 has rotated approximately 45 degrees relative to fuselage 12. Mast assemblies 24a, 24b have rotated to the horizontal orientation. Tail members 16a, 16b have fully lowered to an anhedral orientation. The rotor blades are in a stowed orientation about pylon assemblies 22a, 22b. FIG. 1D illustrates aircraft 10 in the storage mode. As illustrated, wing 18 is in stowed orientation, generally parallel to fuselage 12. Mast assemblies 24a, 24b are in the horizontal orientation. Tail members 16a, 16b are fully lowered to the anhedral orientation. The rotor blades are in a stowed orientation about pylon assemblies 22a, 22b. As illustrated, the storage mode of aircraft 10 depicted and described with reference to FIG. 1D significantly reduces the footprint of aircraft 10 as compared to the flight modes of aircraft 10 depicted and described with reference to figured 1A-1B. To return aircraft 10 from storage mode to VTOL flight mode, wing 18 is rotated approximately 90 degrees relative to fuselage 12 to the flight orientation, mast assemblies 24a, 24b are rotated to the vertical orientation, tail members 16a, 16b are rotated to the dihedral orientation and the rotor blades are operated to the radially extended orientation, as best seen in FIG. 1B.

Even though a particular scenario has been depicted and described for transitioning tiltrotor aircraft 10 between VTOL flight mode and storage mode, those having ordinary skill in the art should understand that other transition scenarios are possible and are considered to be within the scope of the present disclosure. For example, instead of the rotor blades having a stowed orientation about pylon assemblies 22a, 22b, as depicted in FIGS. 1C-1D, the rotor blades could alternatively be folded such that in the stowed orientation, the rotor blades of each proprotor are generally perpendicular to the respective mast assemblies 24a, 24b, generally parallel to one another and generally parallel to wing 18. Likewise, in some embodiments, in may not be necessary to lower tail members 16a, 16b from the dihedral to the anhedral orientation, as sufficient clearance exists for pylon assembly 22a relative to tail members 16a, 16b without tail member manipulation. Alternatively or additionally, clearance for pylon assembly 22a relative to tail members 16a, 16b may be developed by tilting wing 18 relative to fuselage 12 during rotation such that pylon assembly 22a gains certain elevation relative to tail members 16a, 16b as pylon assembly 22a approaches tail members 16a, 16b.

Referring to FIGS. 2A-2C and 3A-3B in the drawings, a wing pivot apparatus for rotating a wing of a tiltrotor aircraft between the flight orientation and the stowed orientation is depicted in various states and is generally designated 50. In the illustrated embodiment, wing pivot apparatus 50 includes a guide ring 52 that is fixably coupled to fore-aft beams 54a, 54b of fuselage 12 by bolting, welding or other suitable technique. Alternatively or additionally, guide ring 52 may be fixably coupled to one or more cross beams extending between fore-aft beams 54a, 54b. Regardless of the exact connection configuration, guide ring 52 is fixed relative to fuselage 12 and does not rotate relative to fuselage 12. Preferably, guide ring 52 has an I-beam cross section including an upper rail 56. Moveably or slidably supported by upper rail 56 of guide ring 52 is a plurality of wing attach assemblies 58a, 58b, 58c, 58d. Wing attach assemblies 58a, 58b are coupled to forward spar 28a of spar assembly 28 and wing attach assemblies 58c, 58d are coupled to aft spar 28b of spar assembly 28. As discussed herein, spar assembly 28 extends the span of wing 18 and serves as the primary structural member of wing 18. Portions of wing attach assemblies 58a, 58b, 58c, 58d are securably coupled directly or indirectly to spar assembly 28 including, for example, being integral with spar assembly 28.

Spar assembly 28 is also directly or indirectly coupled to a plurality of wing support fittings 60a, 60b, 60c, 60d. Wing support fittings 60a, 60b are coupled to forward spar 28a of spar assembly 28, see for example wing support fitting 60a in FIG. 4A, and wing support fittings 60c, 60d are coupled to aft spar 28b of spar assembly 28, see for example wing support fitting 60c in FIG. 4B. In addition, wing support fittings 60a, 60d are selectively secured to fore-aft beam 54a of fuselage 12 and wing support fittings 60b, 60c are selectively secured to fore-aft beam 54b of fuselage 12 with lock assemblies illustrated as a plurality of actuated pins, only actuated pins 62a, 62b, 62d, 62e being visible in FIGS. 3A-3B. The actuated pins are preferably fail safe actuated pins that are controlled by an onboard computing system operable to receive sensor data from and send commands to controllers associated with each of the actuated pins. Preferably, the onboard computing system is operable to individually and independently control and operate each of the actuated pins.

Figure 2A:
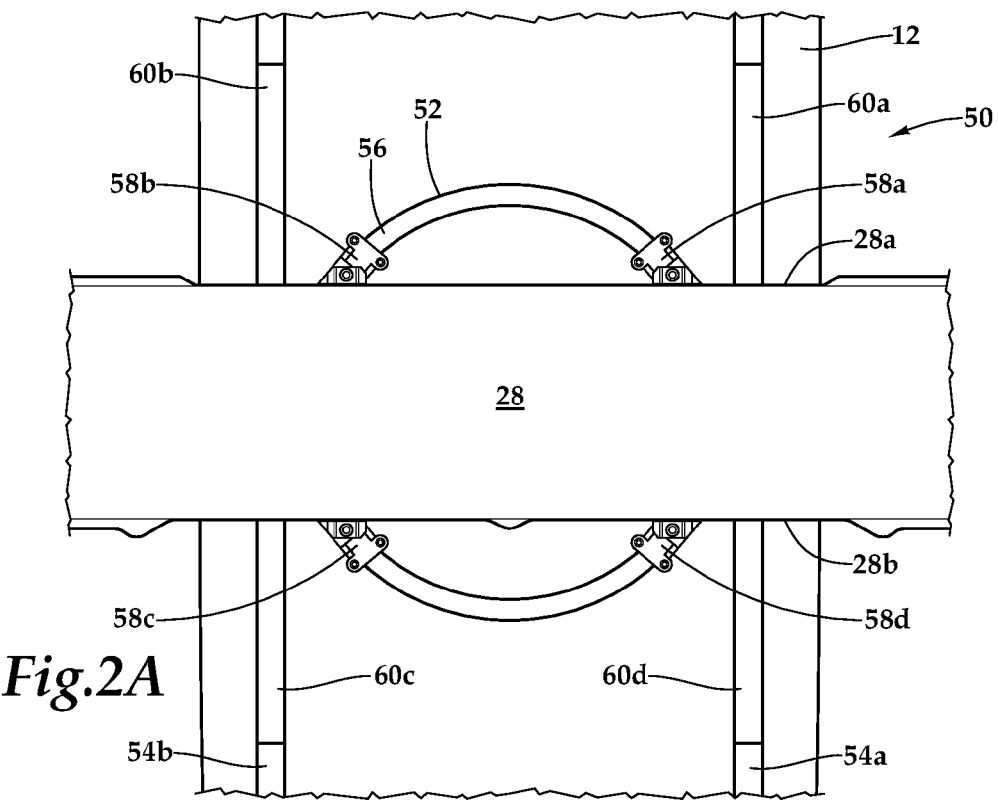
FIGS. 2A-2C are top views of a wing pivot apparatus rotating a wing of a tiltrotor aircraft between a flight orientation and a stowed orientation in accordance with embodiments of the present disclosure.
Figure 2B:
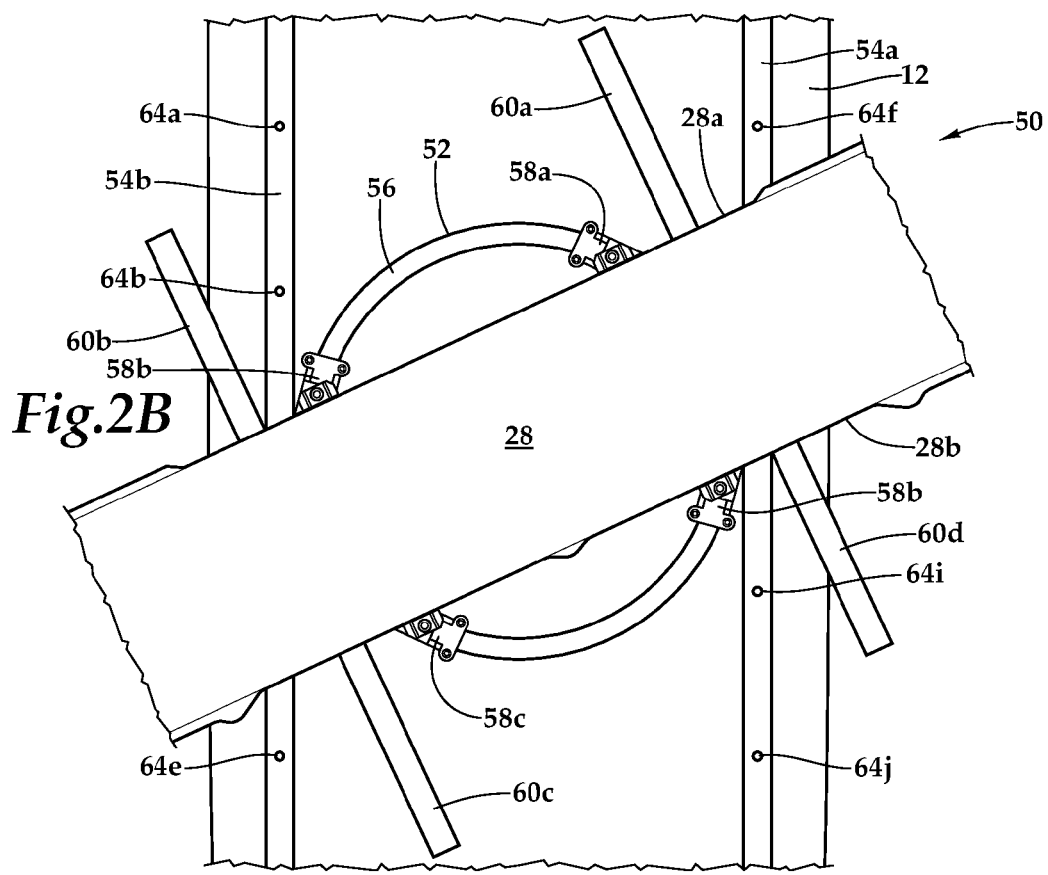
Figure 2C:
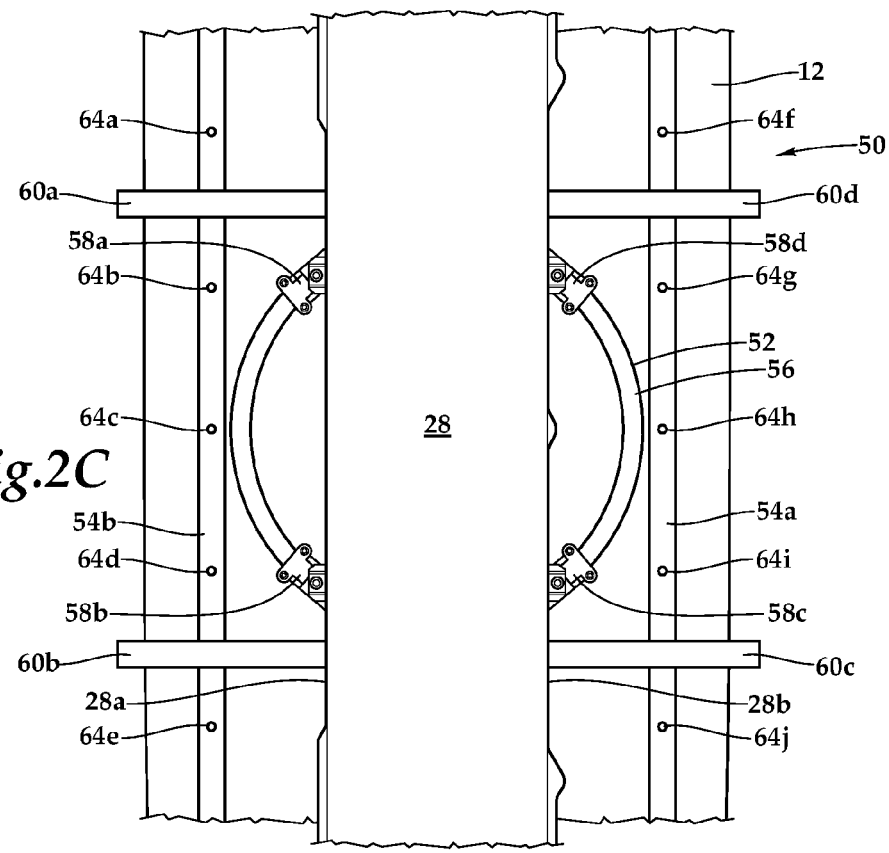
Figure 3A:
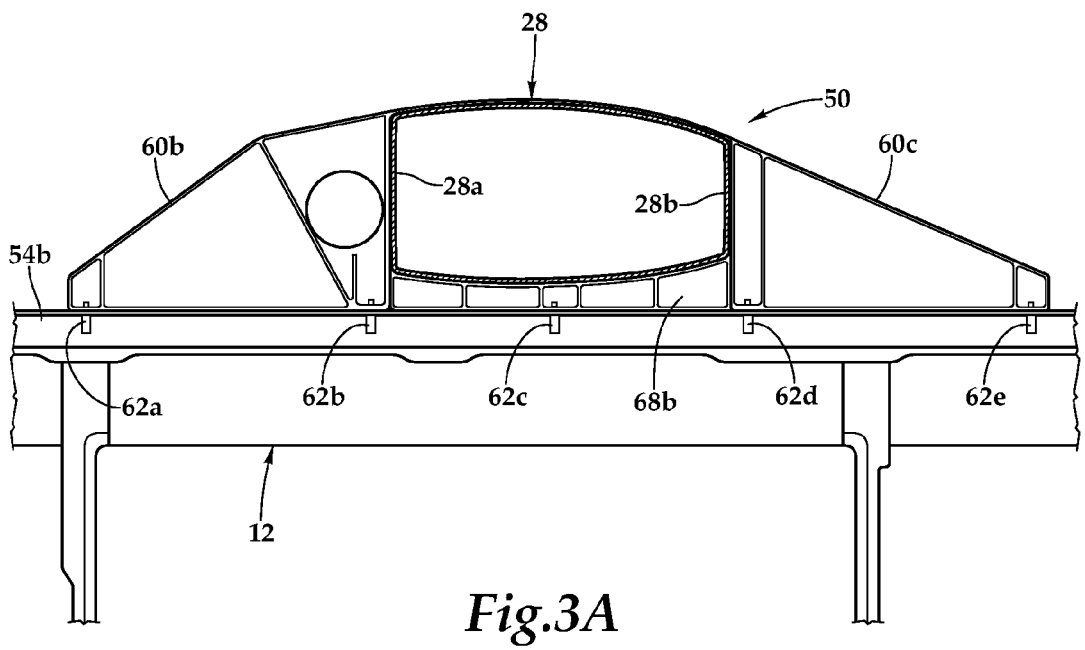
FIGS. 3A-3B are side and isometric views of a wing pivot apparatus for rotating a wing of a tiltrotor aircraft between a flight orientation and a stowed orientation in accordance with embodiments of the present disclosure.
Figure 3B:
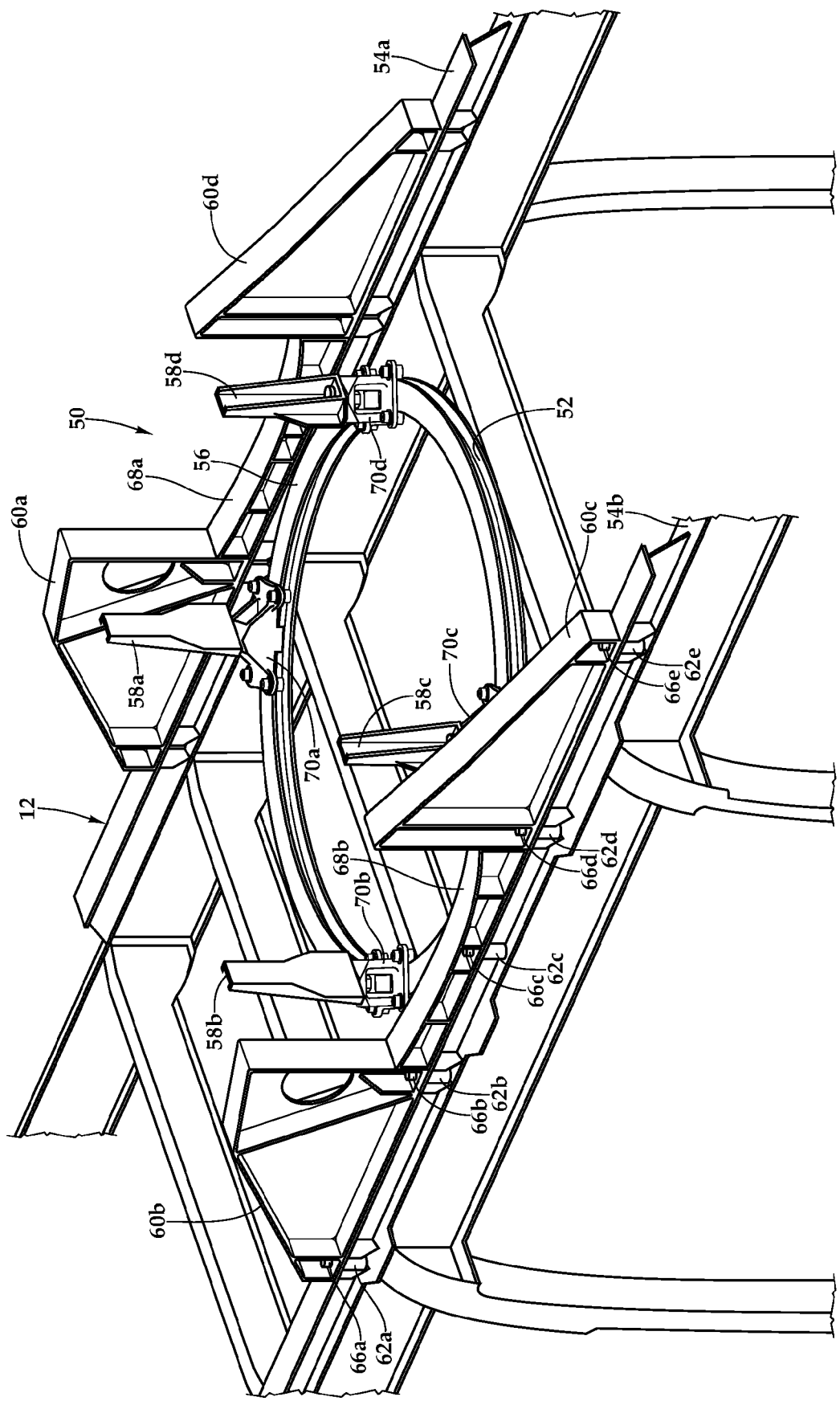
Figure 4A:
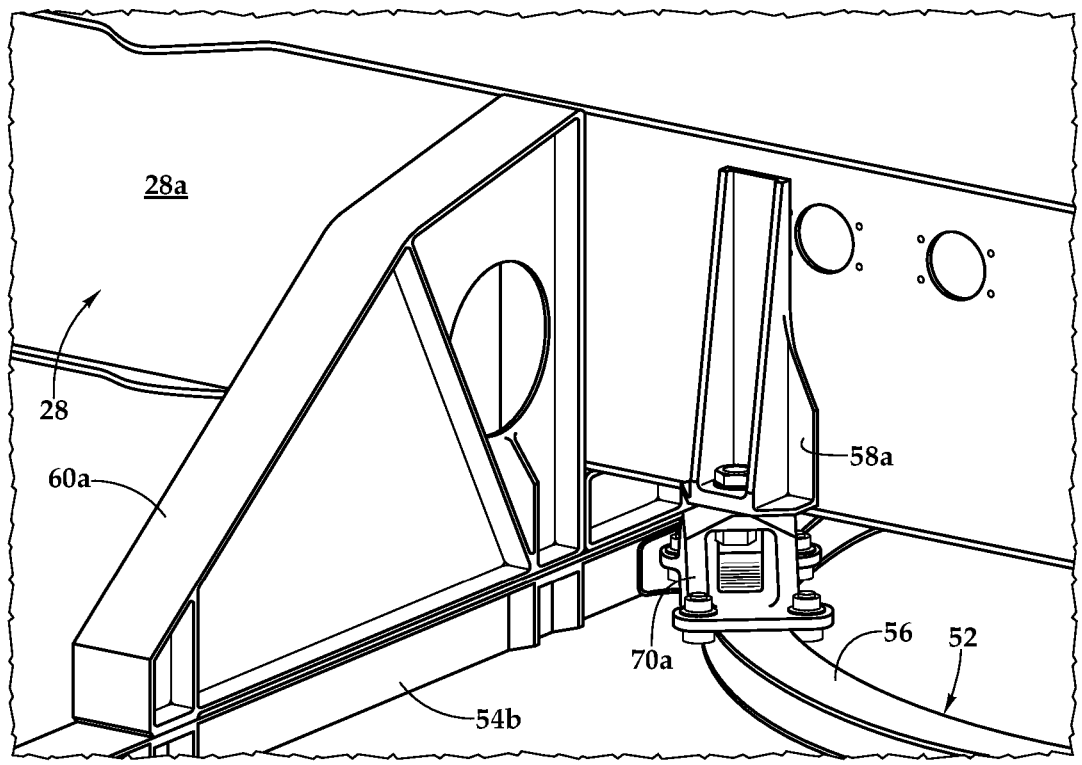
FIGS. 4A-4C are enlarged views of wing attach assemblies and wing support fittings of a wing pivot apparatus for rotating a wing of a tiltrotor aircraft between a flight orientation and a stowed orientation in accordance with embodiments of the present disclosure.
Figure 4B:
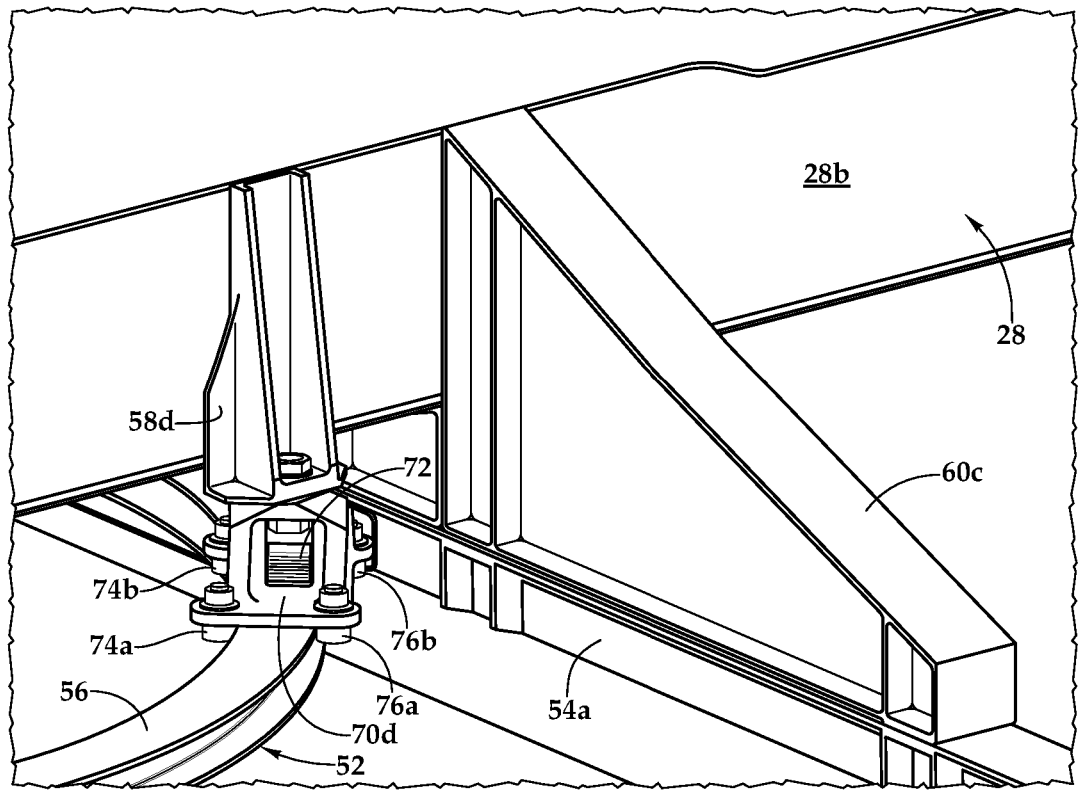

As best seen in FIG. 2C, the actuated pins extend through openings 64a-64j in fore-aft beams 54a, 54b and openings of wing support fittings 60a, 60b, 60c, 60d, only openings 66a, 66b, 66d, 66e being visible in FIG. 3B. More specifically, the actuated pins selectively secure wing support fittings 60a, 60b, 60c, 60d directly to the respective fore-aft beams 54a, 54b when the respective openings are aligned and wing 18 is in flight orientation. In the illustrated embodiment, two actuated pins selectively secure each wing support fitting 60a, 60b, 60c, 60d to the respective fore-aft beam 54a, 54b. In other embodiments, a greater or lesser number of actuated pins may be used to selectively secure each wing support fitting 60a, 60b, 60c, 60d to the respective fore-aft beam 54a, 54b. A pair of spacer assemblies 68a, 68b is positioned respectively between spar assembly 28 and fore-aft beam 54a, 54b. Spacer assembly 68a is disposed between wing support fittings 60a, 60d and spacer assembly 68b is disposed between wing support fittings 60b, 60c. Preferably, spacer assembly 68a is directly or indirectly coupled to wing support fittings 60a, 60d and spacer assembly 68b is directly or indirectly coupled to wing support fittings 60b, 60c. Alternatively or additionally, spacer assemblies 68a, 68b may be directly or indirectly coupled to spar assembly 28. Spacer assemblies 68a, 68b are selectively secured respectively to fore-aft beams 54a, 54b of fuselage 12 with lock assemblies illustrated as a plurality of actuated pins, only actuated pin 62c being visible in FIGS. 3A-3B.

Figure 4C:
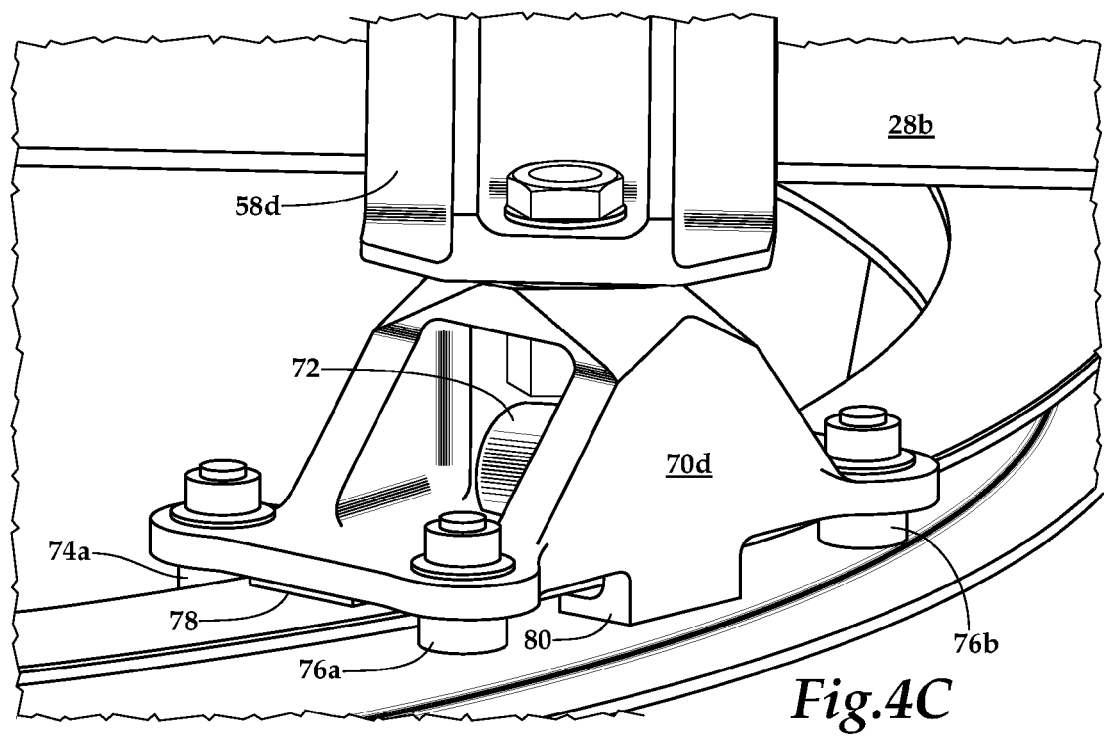

As illustrated in the progression of FIGS. 2A-2C, wing attach assemblies 58a, 58b, 58c, 58d, wing support fittings 60a, 60b, 60c, 60d and spacer assemblies 68a, 68b rotate together with spar assembly 28 to reversibly rotate wing 18 between the flight orientation and the stowed orientation. More specifically, wing attach assemblies 58a, 58b, 58c, 58d each travel along a portion of upper rail 56 of guide ring 52. As best seen in FIG. 4C, wing attach assembly 58d includes a roller bearing assembly 70d that engages rail 56 to enable wing 18 to rotate relative to fuselage 12. It is noted that roller bearing assembly 70d is substantially similar to roller bearing assemblies 70a, 70b, 70c therefore, for sake of efficiency, certain features will be disclosed only with regard to roller bearing assembly 70d. One having ordinary skill in the art, however, will fully appreciate an understanding of roller bearing assemblies 70a, 70b, 70c based upon the disclosure herein of roller bearing assembly 70d. In the illustrated embodiment, roller bearing assembly 70d includes a central roller 72 that engages an upper surface of rail 56, inner roller bearings 74a, 74b that engage an inner surface of rail 56 and outer roller bearings 76a, 76b that engage an outer surface of rail 56. In addition, roller bearing assembly 70d may include one or more wear resistant and/or low friction pads, such as pad 78 that may engages an upper surface of rail 56 under certain load conditions. In some embodiments, pads 78 may be used instead of central roller 72. Further, roller bearing assembly 70d includes side channels, such as side channel 80 to prevent disengagement of roller bearing assembly 70d from rail 56.

Figure 5A:
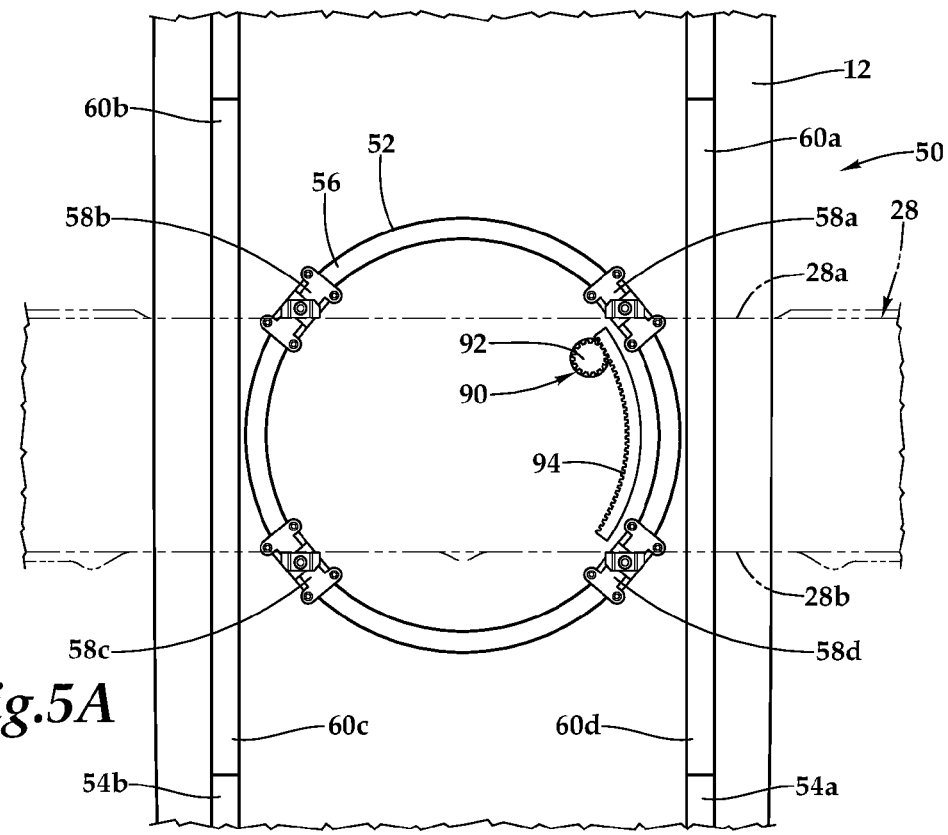
FIGS. 5A-5C are top views of a wing pivot apparatus for rotating a wing of a tiltrotor aircraft between a flight orientation and a stowed orientation including exemplary actuators in accordance with embodiments of the present disclosure.

To cause wing 18 to rotate between the flight orientation and the stowed orientation, one or more actuators may be used. It is noted that prior to transitioning wing 18 from the flight orientation and the stowed orientation, the lock assemblies selectively securing wing support fittings 60a, 60b, 60c, 60d and spacer assemblies 68a, 68b to the respective fore-aft beams 54a, 54b must be disengaged. In the illustrated embodiment, this is achieved by withdrawing the actuated pins from engagement with the openings of wing support fittings 60a, 60b, 60c, 60d, spacer assemblies 68a, 68b and fore-aft beams 54a, 54b. Thereafter, rotation of wing 18 from the flight orientation to the stowed orientation may commence. As best seen in FIG. 5A, a gear driven rotary actuator 90 includes a gear assembly 92 that is coupled to fuselage 12 and a rack assembly 94 that is coupled to a lower surface of spar assembly 28. Preferably, rotation of gear assembly 92 is controlled by an onboard computing system operable to receive sensor data from and send commands to a controller associated with gear assembly 92 to enable gear assembly 92 to rotate in the desired direction at the desired speed to transition wing 18 between the flight orientation and the stowed orientation.

Figure 5B:
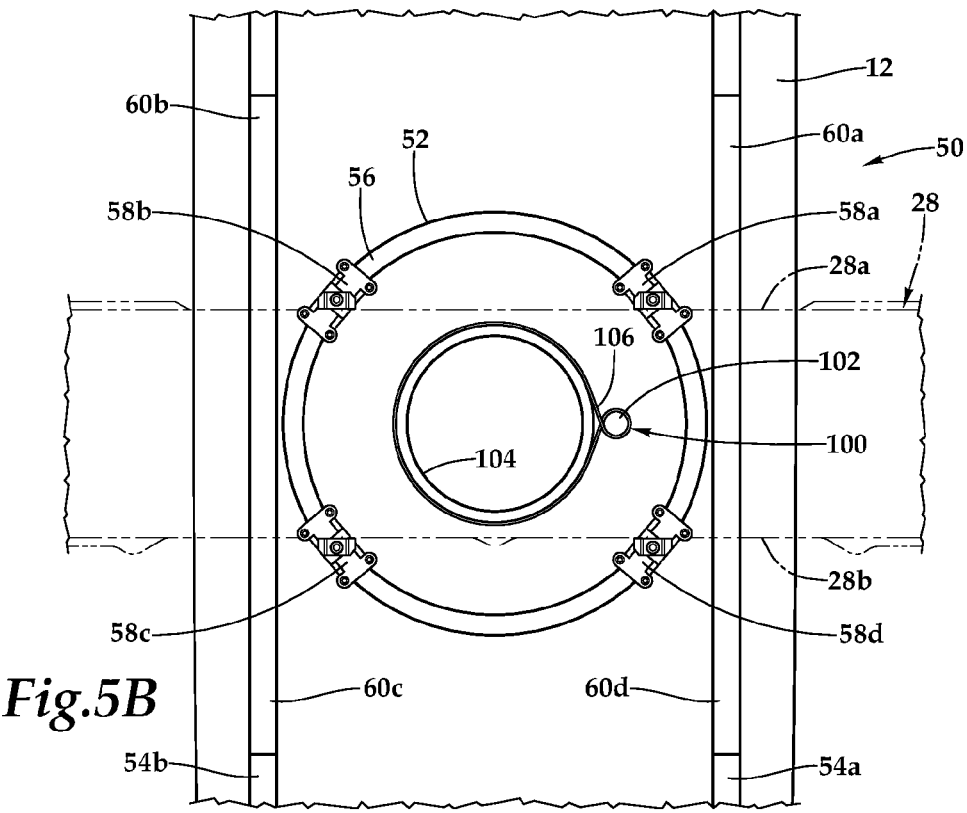
Figure 5C:
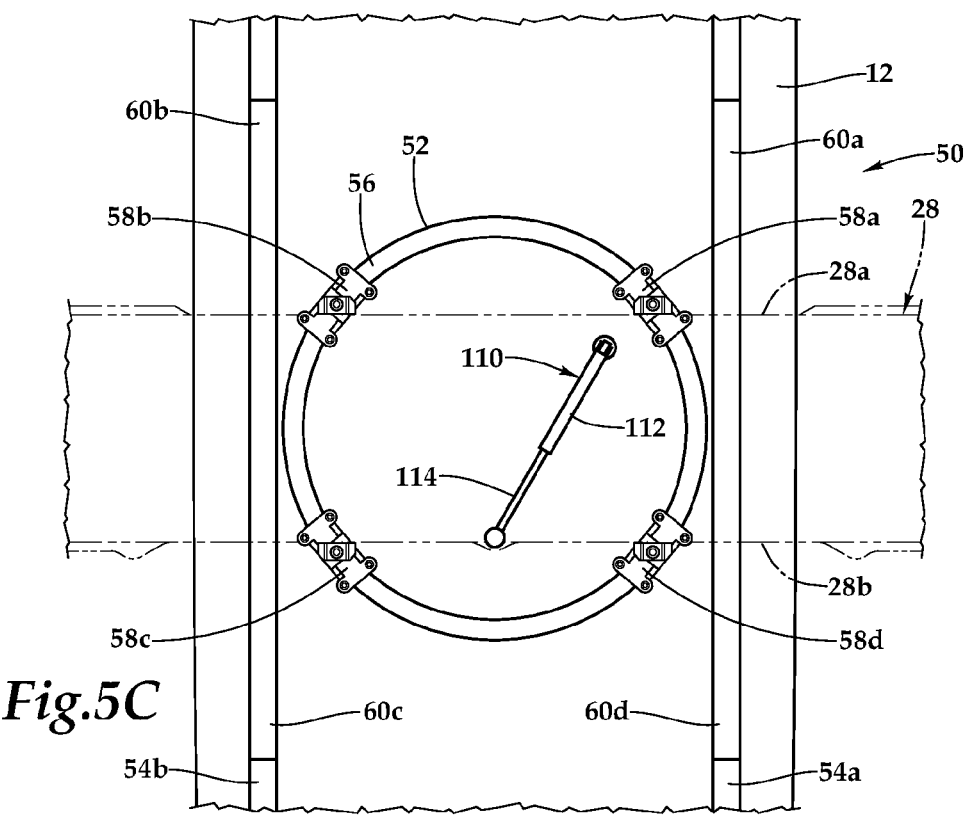

In another example, as best seen in FIG. 5B, a capstan rotary actuator 100 includes a drum assembly 102 that is coupled to fuselage 12, a track assembly 104 that is coupled to a lower surface of spar assembly 28 and a cable 106 wrapped around drum assembly 102 and track assembly 104 such that rotation of drum assembly 102 causes track assembly 104 to rotate. Preferably, rotation of drum assembly 102 is controlled by an onboard computing system operable to receive sensor data from and send commands to a controller associated with drum assembly 102 to enable drum assembly 102 to rotate in the desired direction at the desired speed to transition wing 18 between the flight orientation and the stowed orientation. In a further example, as best seen in FIG. 5C, a linear actuator 110 includes a cylinder assembly 112 that is coupled to fuselage 12 and a piston assembly 114 that is coupled to a lower surface of spar assembly 28. Preferably, extension and retraction of piston assembly 114 relative to cylinder assembly 112 is controlled by an onboard computing system operable to receive sensor data from and send commands to a controller associated with linear actuator 110 to enable extension and retraction of linear actuator 110 to transition wing 18 between the flight orientation and the stowed orientation.

Referring to FIGS. 6A-6C and 7A-7B in the drawings, a wing pivot apparatus for rotating a wing of a tiltrotor aircraft between the flight orientation and the stowed orientation is depicted in various states and is generally designated 150. In the illustrated embodiment, wing pivot apparatus 150 includes a guide ring 152 that is fixably coupled to fore-aft beams 154a, 154b of fuselage 12 by bolting, welding or other suitable technique. Alternatively or additionally, guide ring 152 may be fixably coupled to one or more cross beams extending between fore-aft beams 154a, 154b. Regardless of the exact connection configuration, guide ring 152 is fixed relative to fuselage 12 and does not rotate relative to fuselage 12. Preferably, guide ring 152 has an I-beam cross section including an upper rail 156. Moveably or slidably supported by upper rail 156 of guide ring 152 is a plurality of wing attach assemblies 158a, 158b, 158c, 158d. Wing attach assemblies 158a, 158b are coupled to forward spar 28a of spar assembly 28 and wing attach assemblies 158c, 158d are coupled to aft spar 28b of spar assembly 28. As discussed herein, spar assembly 28 extends the span of wing 18 and serves as the primary structural member of wing 18. Portions of wing attach assemblies 158a, 158b, 158c, 158d are securably coupled directly or indirectly to spar assembly 28 including, for example, being integral with spar assembly 28.

Figure 8A:
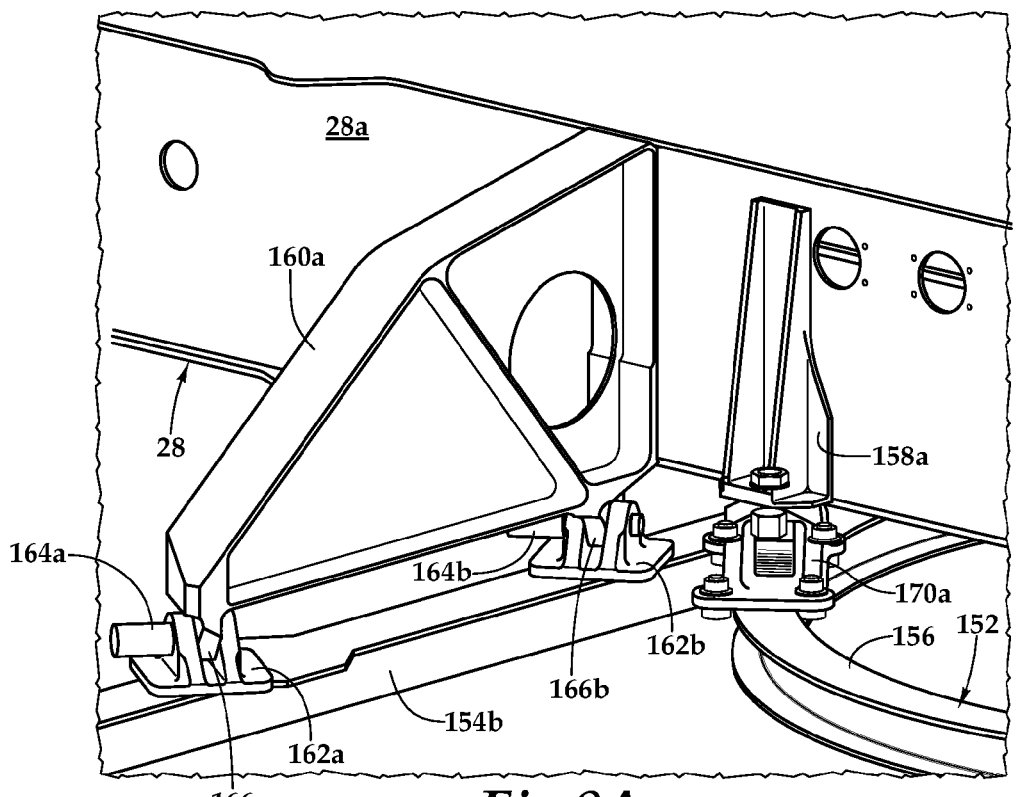
FIGS. 8A-8B are enlarged views of wing attach assemblies and wing support fittings of a wing pivot apparatus for rotating a wing of a tiltrotor aircraft between a flight orientation and a stowed orientation in accordance with embodiments of the present disclosure.
Figure 8B:
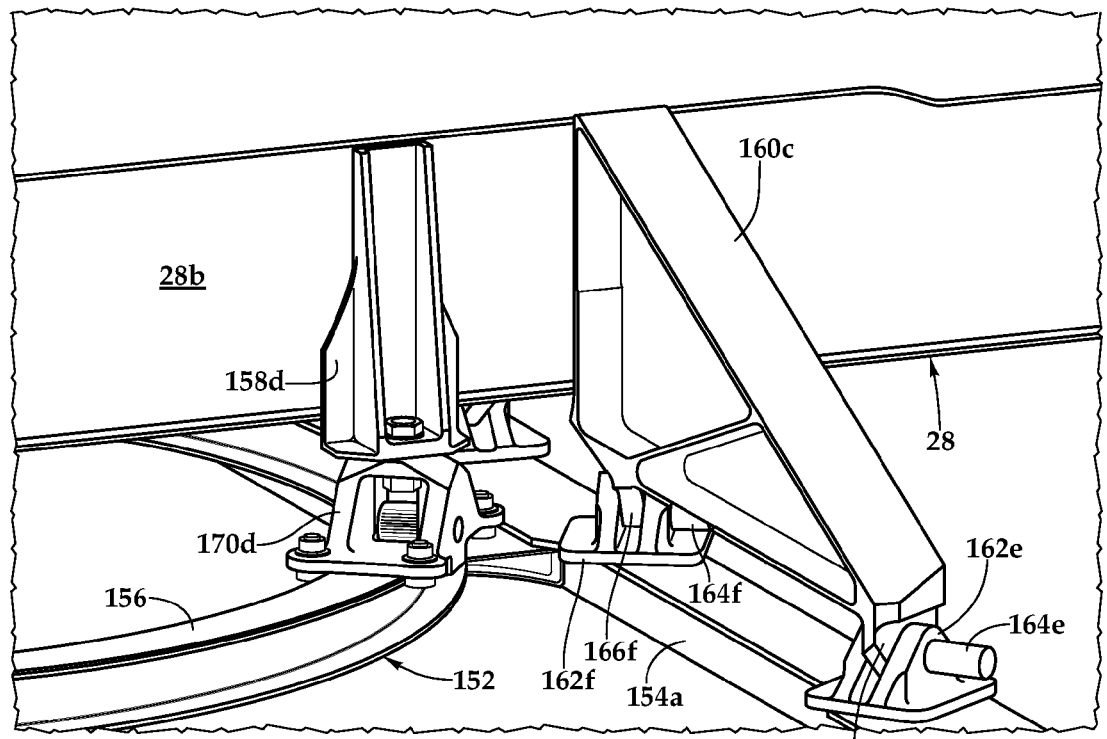

Spar assembly 28 is also directly or indirectly coupled to a plurality of wing support fittings 160a, 160b, 160c, 160d. Wing support fittings 160a, 160b are coupled to forward spar 28a of spar assembly 28, see for example wing support fitting 160a in FIG. 8A, and wing support fittings 160c, 160d are coupled to aft spar 28b of spar assembly 28, see for example wing support fitting 160c in FIG. 8B. In addition, wing support fittings 160a, 160d are selectively secured to fore-aft beam 154a of fuselage 12 and wing support fittings 160b, 160c are selectively secured to fore-aft beam 154b of fuselage 12. More specifically, a plurality of devises 162a, 162b, 162c, 162d, 162e, 162f, 162g, 162h, 162i, 162j are securably coupled to fore-aft beams 154a, 154b of fuselage 12. Each clevis 162a, 162b, 162c, 162d, 162e, 162f, 162g, 162h, 162i, 162j has a lock assembly associated therewith illustrated as a plurality of actuated pins 164a, 164b, 164c, 164d, 164e, 164f, 164g, 164h, 164i, 164j. The actuated pins are preferably fail safe actuated pins that are controlled by an onboard computing system operable to receive sensor data from and send commands to controllers associated with each of the actuated pins. Preferably, the onboard computing system is operable to individually and independently control and operate each of the actuated pins.

Figure 7A:
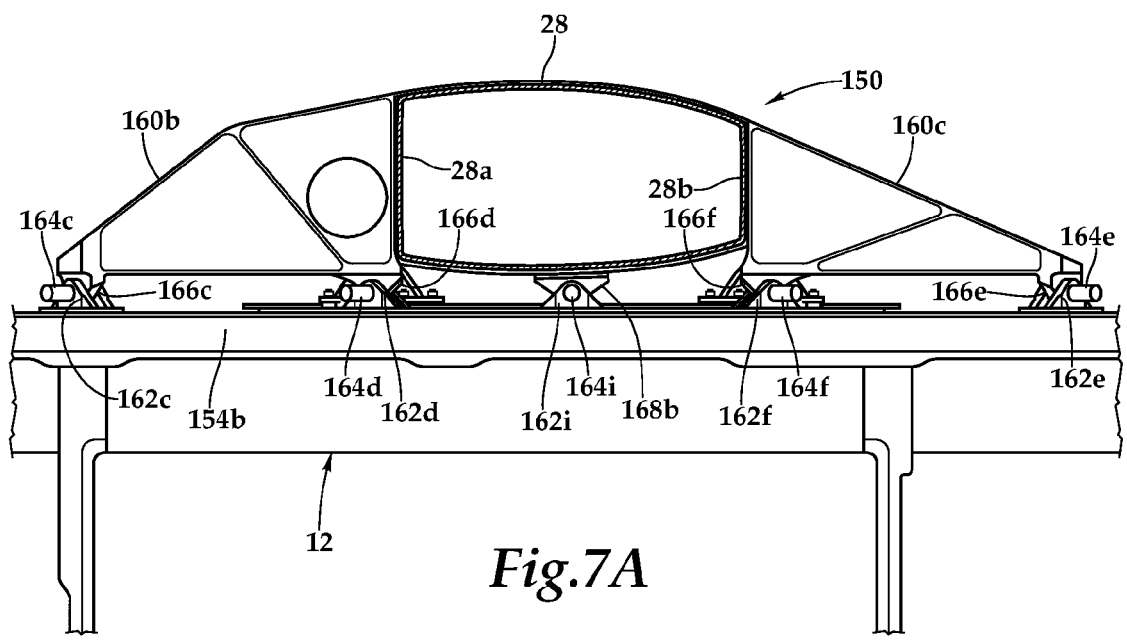
FIGS. 7A-7B are side and isometric views of a wing pivot apparatus for rotating a wing of a tiltrotor aircraft between a flight orientation and a stowed orientation in accordance with embodiments of the present disclosure.
Figure 7B:
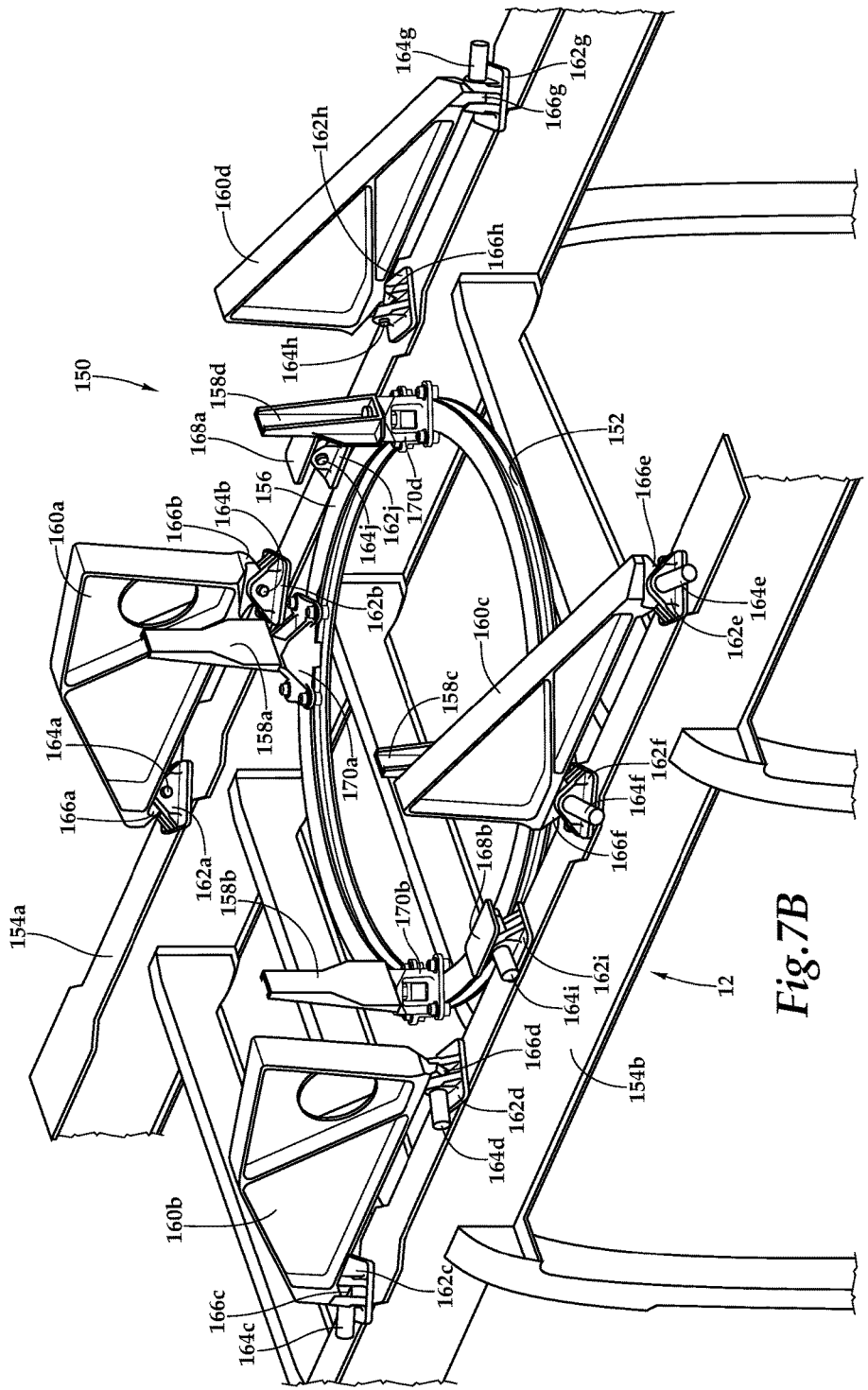

Each wing support fitting 160a, 160b, 160c, 160d includes two lugs that are operable to sweep through respective devises 162a, 162b, 162c, 162d, 162e, 162f, 162g, 162h as wing 18 is transitioned between the flight orientation and the stowed orientation. As best seen in FIG. 7B, wing support fitting 160a includes lugs 166a, 166b, wing support fitting 160b includes lugs 166c, 166d, wing support fitting 160c includes lugs 166e, 166f and wing support fitting 160d includes lugs 166g, 166h. Actuated pins 164a, 164b, 164c, 164d, 164e, 164f, 164g, 164h extend through respective openings in devises 162a, 162b, 162c, 162d, 162e, 162f, 162g, 162h and lugs 166a, 166b, 166c, 166d, 166e, 166f, 166g, 166h. As such, actuated pins 164a, 164b, 164c, 164d, 164e, 164f, 164g, 164h selectively secure wing support fittings 160a, 160b, 160c, 160d to the respective fore-aft beams 154a, 154b when the respective openings of devises 162a, 162b, 162c, 162d, 162e, 162f, 162g, 162h and lugs 166a, 166b, 166c, 166d, 166e, 166f, 166g, 166h are aligned and wing 18 is in flight orientation. In the illustrated embodiment, two actuated pins selectively secure each wing support fitting 160a, 160b, 160c, 160d to the respective fore-aft beam 154a, 154b. In other embodiments, a greater or lesser number of actuated pins may be used to selectively secure each wing support fitting 160a, 160b, 160c, 160d to the respective fore-aft beam 154a, 154b. Two additional lugs 168a, 168b are securably coupled to the lower surface of spar assembly 28 and are operable to sweep through devises 162i, 162j as wing 18 is transitioned between the flight orientation and the stowed orientation. Actuated pins 164i, 164j extend through respective openings in devises 162i, 162j and lugs 168a, 168b. As such, actuated pins 164i, 164j selectively secure spar assembly 28 to the respective fore-aft beams 154a, 154b when the respective openings of devises 162i, 162j and lugs 168a, 168b are aligned and wing 18 is in flight orientation.

Figure 6A:
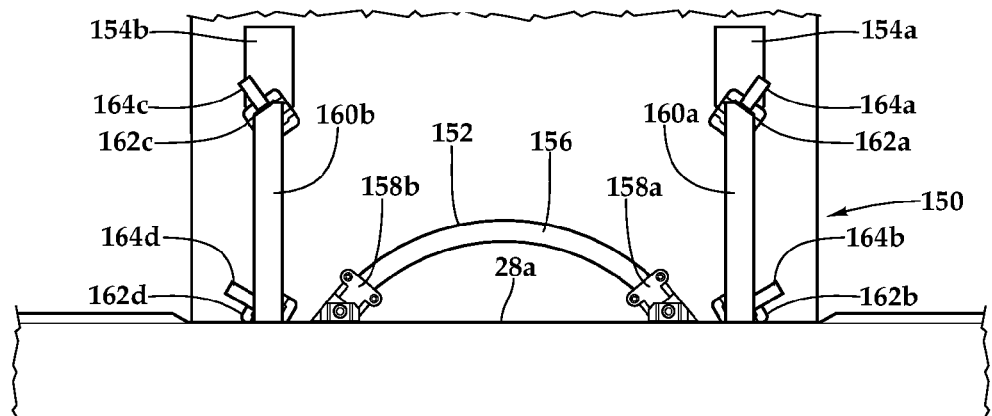
FIGS. 6A-6C are top views of a wing pivot apparatus rotating a wing of a tiltrotor aircraft between a flight orientation and a stowed orientation in accordance with embodiments of the present disclosure.
Figure 6B:
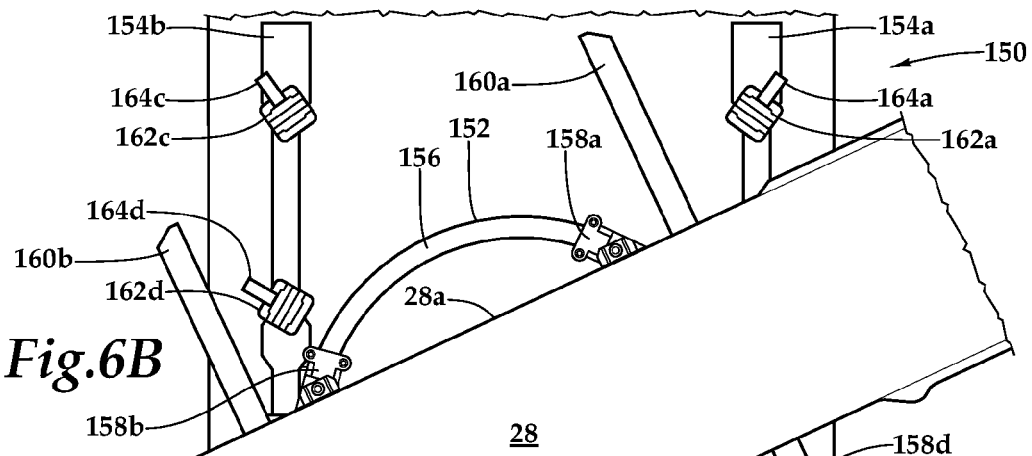
Figure 6C:
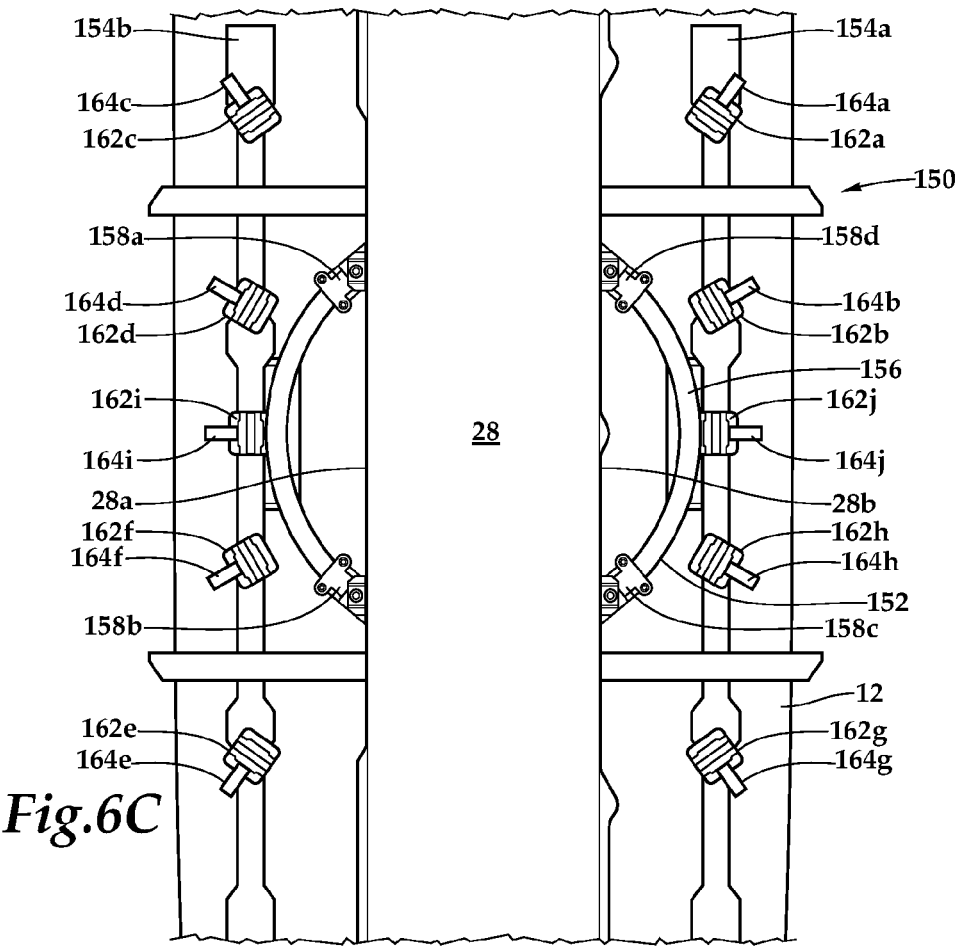

As illustrated in the progression of FIGS. 6A-6C, wing attach assemblies 158a, 158b, 158c, 158d and wing support fittings 160a, 160b, 160c, 160d rotate together with spar assembly 28 to reversibly rotate wing 18 between the flight orientation and the stowed orientation. More specifically, wing attach assemblies 158a, 158b, 158c, 158d each travel along a portion of upper rail 156 of guide ring 152. Each wing attach assembly 158a, 158b, 158c, 158d respectively includes a roller bearing assembly 170a, 170b, 170c, 170d that engages rail 156 to enable wing 18 to rotate relative to fuselage 12. It is noted that roller bearing assemblies 170a, 170b, 170c, 170d are substantially similar to roller bearing assembly 70d discussed herein. To cause wing 18 to rotate between the flight orientation and the stowed orientation, one or more actuators, such as actuators 90, 100, 110 discussed herein, may be used.

The foregoing description of embodiments of the disclosure has been presented for purposes of illustration and description. It is not intended to be exhaustive or to limit the disclosure to the precise form disclosed, and modifications and variations are possible in light of the above teachings or may be acquired from practice of the disclosure. The embodiments were chosen and described in order to explain the principals of the disclosure and its practical application to enable one skilled in the art to utilize the disclosure in various embodiments and with various modifications as are suited to the particular use contemplated. Other substitutions, modifications, changes and omissions may be made in the design, operating conditions and arrangement of the embodiments without departing from the scope of the present disclosure. Such modifications and combinations of the illustrative embodiments as well as other embodiments will be apparent to persons skilled in the art upon reference to the description. It is, therefore, intended that the appended claims encompass any such modifications or embodiments.

What is claimed is:

1. A wing pivot apparatus for rotating a wing between a flight orientation and a stowed orientation relative to a fuselage of a tiltrotor aircraft, the wing having forward and aft spars and the fuselage having first and second fore-aft beams, the apparatus comprising:
    a guide ring fixably coupled to the fuselage;
    forward wing attach assemblies coupled to the forward spar of the wing and moveably supported by the guide ring;
    aft wing attach assemblies coupled to the aft spar of the wing and moveably supported by the guide ring;
    first and second forward wing support fittings coupled to the forward spar of the wing and selectively securable respectively to the first and second fore-aft beams of the fuselage at locations forward of the guide ring;
    first and second aft wing support fittings coupled to the aft spar of the wing and selectively securable respectively to the first and second fore-aft beams of the fuselage at locations aft of the guide ring;
    a plurality of lock assemblies selectively securing the wing support fittings to the fore-aft beams of the fuselage when the wing is in the flight orientation; and
    an actuator coupled to the fuselage operable to reversibly rotate the wing between the flight orientation and the stowed orientation.

2. The apparatus as recited in claim 1 wherein the guide ring further comprises a rail.

3. The apparatus as recited in claim 2 wherein the wing attach assemblies each further comprise at least one roller bearing operable to engage the rail.

4. The apparatus as recited in claim 1 wherein the guide ring is securably coupled to the first and second fore-aft beams of the fuselage.

5. The apparatus as recited in claim 1 wherein the lock assemblies selectively secure the wing support fittings directly to the fore-aft beams of the fuselage.

6. The apparatus as recited in claim 1 further comprising a plurality of forward devises securably coupled to the fore-aft beams of the fuselage forward of the guide ring and plurality of aft devises securably coupled to the fore-aft beams of the fuselage aft of the guide ring and wherein, the wing support fittings each include at least one lug that is operable to sweep through the forward and aft clevises such that the lock assemblies are operable to selectively secure the forward wing support fittings to the fore-aft beams of the fuselage forward of the guide ring and the aft wing support fittings to the fore-aft beams of the fuselage aft of the guide ring when the wing is in the flight orientation and such that the actuator is operable to reversibly rotate the wing between the flight orientation and the stowed orientation when the lock assemblies are disengaged.

7. The apparatus as recited in claim 1 wherein the lock assemblies further comprise actuated pins.

8. The apparatus as recited in claim 1 wherein the actuator further comprises a rotary actuator.

9. The apparatus as recited in claim 8 wherein the rotary actuator further comprises a capstan actuator.

10. The apparatus as recited in claim 8 wherein the rotary actuator further comprises a gear driven actuator.

11. The apparatus as recited in claim 1 wherein the actuator further comprises a linear actuator.

12. A tiltrotor aircraft having a VTOL flight mode, a forward flight mode and a storage mode, the aircraft comprising:
    a fuselage;
    a wing rotatably mounted to the fuselage, the wing reversibly rotatable between a flight orientation, substantially perpendicular to the fuselage, in the flight modes, and a stowed orientation, substantially parallel to the fuselage, in the storage mode;

a wing pivot apparatus disposed between the fuselage and the wing, the wing pivot apparatus including:

a guide ring fixably coupled to the fuselage;

forward wing attach assemblies coupled to the forward spar of the wing and moveably supported by the guide ring;

aft wing attach assemblies coupled to the aft spar of the wing and moveably supported by the guide ring;

first and second forward wing support fittings coupled to the forward spar of the wing and selectively securable respectively to the first and second fore-aft beams of the fuselage at locations forward of the guide ring;

first and second aft wing support fittings coupled to the aft spar of the wing and selectively securable respectively to the first and second fore-aft beams of the fuselage at locations aft of the guide ring;

a plurality of lock assemblies selectively securing the wing support fittings to the fore-aft beams of the fuselage when the wing is in the flight orientation; and an actuator coupled to the fuselage operable to reversibly rotate the wing between the flight orientation and the stowed orientation.

13. The aircraft as recited in claim 12 wherein the guide ring further comprises a rail.

14. The aircraft as recited in claim 13 wherein the wing attach assemblies each further comprise at least one roller bearing operable to engage the rail.

15. The aircraft as recited in claim 12 wherein the lock assemblies selectively secure the wing support fittings directly to the fore-aft beams of the fuselage.

16. The aircraft as recited in claim 12 further comprising a plurality of forward devises securably coupled to the fore-aft beams of the fuselage forward of the guide ring and plurality of aft devises securably coupled to the fore-aft beams of the fuselage aft of the guide ring and wherein, the wing support fittings each include at least one lug that is operable to sweep through the forward and aft devises such that the lock assemblies are operable to selectively secure the forward wing support fittings to the fore-aft beams of the fuselage forward of the guide ring and the aft wing support fittings to the fore-aft beams of the fuselage aft of the guide ring when the wing is in the flight orientation and such that the actuator is operable to reversibly rotate the wing between the flight orientation and the stowed orientation when the lock assemblies are disengaged.

17. The aircraft as recited in claim 12 wherein the lock assemblies further comprise actuated pins.

18. The aircraft as recited in claim 12 wherein the actuator is selected from the group consisting of a rotary actuator, a capstan actuator, a gear driven actuator and a linear actuator.

* * * * *

UNITED STATES PATENT AND TRADEMARK OFFICE
CERTIFICATE OF CORRECTION

PATENT NO. : 10,220,936 B2
APPLICATION NO. : 15/271717
DATED : March 5, 2019
INVENTOR(S) : Kooiman et al.

Page 1 of 1

It is certified that error appears in the above-identified patent and that said Letters Patent is hereby corrected as shown below:

In the Specification

Column 2, Line 22: "devises" should read --clevises--

Column 8, Line 51: "devises" should read --clevises--

Column 8, Line 66: "devises" should read --clevises--

Column 9, Line 7: "devises" should read --clevises--

Column 9, Line 12: "devises" should read --clevises--

Column 9, Line 24: "devises" should read --clevises--

Column 9, Line 27: "devises" should read --clevises--

Column 9, Line 30: "devises" should read --clevises--

In the Claims

Column 10, Line 38: "devises" should read --clevises--

Column 10, Line 40: "devises" should read --clevises--

Column 12, Line 8: "devises" should read --clevises--

Column 12, Line 10: "devises" should read --clevises--

Column 12, Line 13: "devises" should read --clevises--

Signed and Sealed this
Sixteenth Day of April, 2019

Andrei Iancu
*Director of the United States Patent and Trademark Office*